Figure 1:
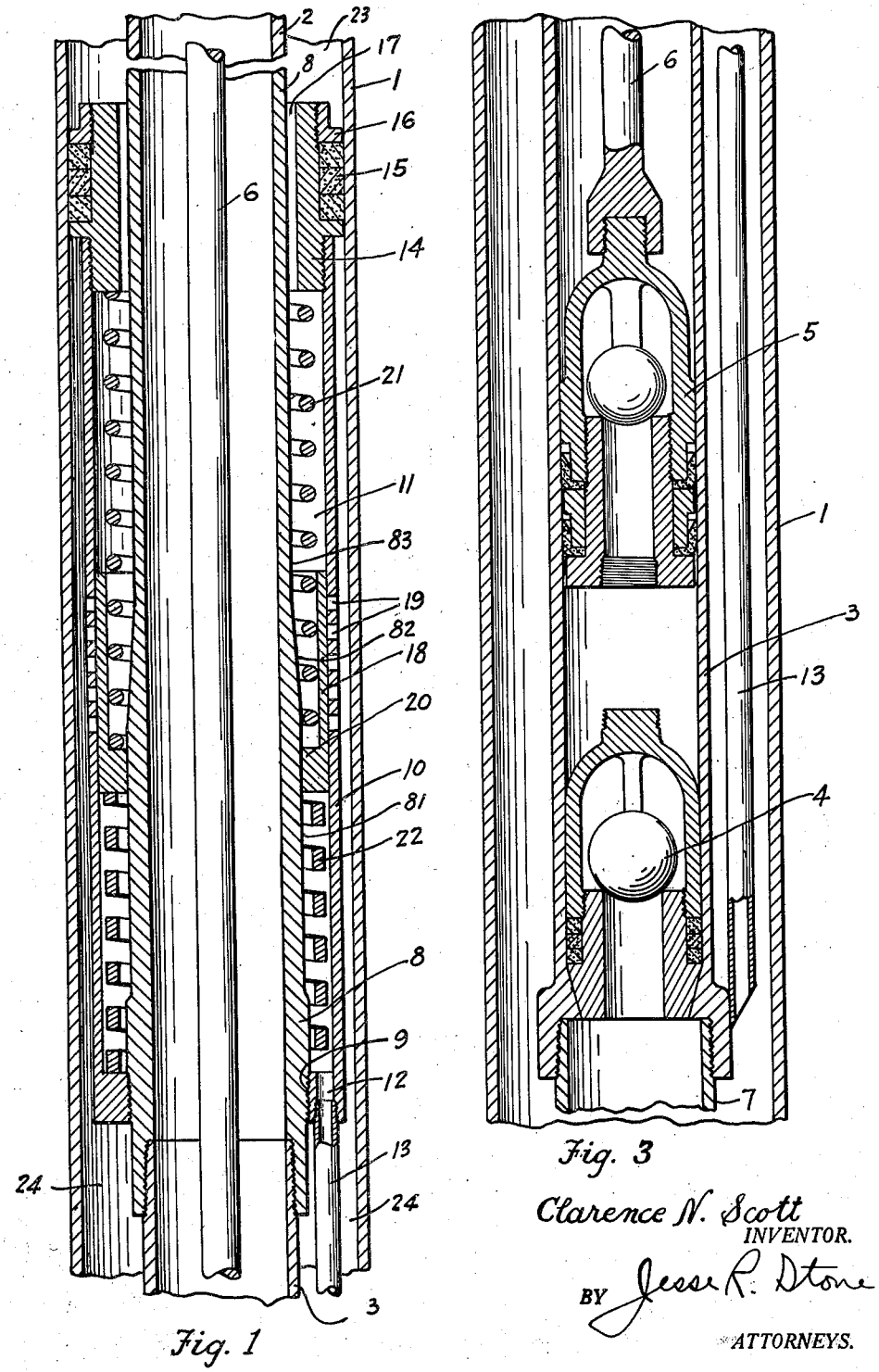

Patented Sept. 3, 1935

2,013,112

UNITED STATES PATENT OFFICE 2,013,112

MEANS AND METHOD FOR PRODUCING FLUID FROM WELLS

Clarence N. Scott, Houston, Tex.

Application December 31, 1934, Serial No. 759,939

9 Claims. (Cl. 103—203)

My invention relates to the operation of bored wells, in the production of oil and gas.

The oil and gas coming from such wells are obtained from strata of sand, porous rock, shale and similar formations in which the fluid is migratorily present.

The fluid is caused to flow from the producing formation into the well bore or cavity by removing the liquid and gas by natural or artificial means from the same to the surface, thus reducing pressure in or removing it entirely from the well cavity and the adjacent producing formation and enabling superior fluid pressure in the outlying producing formation, to cause the fluid to flow towards and into the well cavity.

This reduction or removal of pressure is, as at present, continuously maintained while the well is in operation; which means that the flow of fluid from the producing formation into the well cavity, is a fairly continuous and orderly flow increasing in velocity in the said adjacent formation until maximum velocity of flow is attained as the fluid emerges into the well cavity.

This flow of fluid is through the pores, interstices and pockets which are in the producing formation.

The fluid as it flows in the formation is generally accompanied with fine sand, lime, shale or other matter, largely in suspension and mobile and so-called "floating". They adhere to and accumulate in the pores, interstices and pockets of the formation through which they flow. As they accumulate they pack tightly due to the fact that the flow of fluid is continuous in movement and direction of movement and therefore holds them in a packed state. While the accumulation of this matter is slower in the zone immediately surrounding the well cavity, because of the higher velocity of the flowing fluid in it, the tendency to "pack" and remain "packed" is however greater in that zone and the obstruction thus offered to the flow of the fluid, is much more effective and serious, due to the small flow-areaway immediately surrounding the well cavity.

This clogging of the producing formation naturally reduces the flow of fluid therethrough and adversely affects the production of liquid of the well.

Again, while the fluid is motionless in the formation, or while the flow therethrough is orderly and without agitation, there is a process of dissociation in which the gas and liquid separate and segregate into respective gas and liquid stratifications in the producing formation. As the fluid pressure becomes less in that zone adjacent the well cavity, this stratification of the gas and liquid becomes more pronounced still, with the result that the independent and separate flow of gas into the well cavity from the gas stratification, without inducing or carrying along a corresponding flow of liquid, is greater, but the flow of liquid into the well cavity is less than though the liquid and gas were in intimate admixture and saturation throughout the entire thickness of the producing stratum.

The more open and porous the producing formation is, the greater is the tendency to stratification of the gas and liquid, particularly in the producing formation adjacent the well cavity; and consequently the greater is the useless independent flow of gas from the formation into the well cavity without inducing increased flow of liquid therewith.

The more dissociation and separate stratification there is in the oil and gas in the adjacent formation, the more live and fluid and active the gas is in its separate flow from the adjacent formation into the well cavity. On the contrary, the more dissociation and separate stratification there is in the oil and gas in the adjacent formation, the more inert and lacking in fluidity the oil is and the less its induced flow is from the adjacent formation into the well cavity, and the less the oil production of the well is.

To avoid these and other objectionable conditions, I aim:

(A) To prevent the clogging of the said pores, interstices and pockets in the producing formation around and adjacent the well cavity and to keep them open and thereby maintain the production of the liquid (oil) from the well at the maximum, and;

(B) To prevent or reduce to the minimum the dissociation of the gas and liquid and their consequent segregation into gas and liquid stratification in the producing formation adjacent the well cavity, and;

(C) To restore and/or maintain, intimate association and saturation and admixture of the gas and liquid in and throughout the thickness of the adjacent producing stratum, for the purpose of livening up and making more uniformly resilient and fluid the liquid in said adjacent formation and minimize the useless separate flow of stratified gas into the well cavity without inducing a corresponding flow of liquid therewith into said cavity.

In overcoming these difficulties I desire to cause frequent, rapid and violent automatically-actuated alternating release and reapplication of normal fluid pressure; or release of normal fluid pressure and reapplication of higher than normal fluid pressure; from and to the well cavity and the producing formation adjacent thereto. This is comparable to a "breathing" action of the fluid in said formation, because the volume of gaseous fluid is increased when fluid pressure is released, and is reduced when fluid pressure is restored or increased. This is due to the expansion and compression of the gas held in saturation or admixture throughout the fluid in the well cavity and adjacent formation which makes the fluid live and resilient and compressible and expandible.

I have as a further object to cause in the "pressure reapplication" period of the cycle, a return (or reabsorption) of a portion of the liquid from the lower levels of the well cavity back into the adjacent formation, accompanied by a thorough meandering or churning circulation of the same with gas and inert oil throughout the entire thickness of the said adjacent producing stratum.

These objects are for the purpose of:

(a) Effecting interruptions and accelerations, disturbances and reversals or changes in direction of movement, and also agitation and meandering; of the flow of fluid in the producing formation adjacent the well cavity; and;

(b) Preventing continuous and independent and separate stratified flow of the gas in the said adjacent formation, and;

(c) Forcing more intimate and more complete circulation and admixture of the liquid and gas in and between the oil and gas stratifications and in and between the pores and interstices and pockets of the said formation, and;

(d) Causing frequent, fairly regular, and violent cyclic reductions or removals of pressure in and from the well cavity and adjacent formation, to remove intermittently from the same, pressure resistance to the flow of fluid into them from the surrounding formation, and;

(e) Causing violent regularly-recurring pulsations in the flow of fluid in and from the adjacent formation, and;

(f) Bringing about and maintaining the greatest degree of saturation and admixture and proximity, of the liquid and gas in and throughout the said adjacent formation, with the resulting livening up and making resilient and fluid, the liquid in the said formation, and;

(g) Loosening any pore-clogging matter which may tend to pack or which has become "packed", in the pores, interstices and pockets of the producing formation, particularly adjacent the well cavity.

I also have as an object to bring about, (as a result of the foregoing) the maximum production of oil from an oil well, with the maximum utilization of the minimum quantity of gas to flow the oil from the producing formation into the well cavity. I aim to thus cause a free flow of fluid into a well that is being operated and simultaneously to raise said fluid from the well as it is caused to enter by my method. This operation of pumping the well may be by means of an apparatus such as is here shown, or by any other fluid lifting device which serves to remove the head of liquid.

I have illustrated the invention as applied to an ordinary well, equipped for pumping by the usual reciprocating pump.

Fig. 1 is a central longitudinal section through a well casing and tubing equipped with one form of my invention, for the cyclic release and reapplication of formation fluid pressure from and to the well cavity and the adjacent producing formation. In this form of my invention I use only two casing compartments, a lower and an upper, separated by a housing and a packer.

Figure 2:
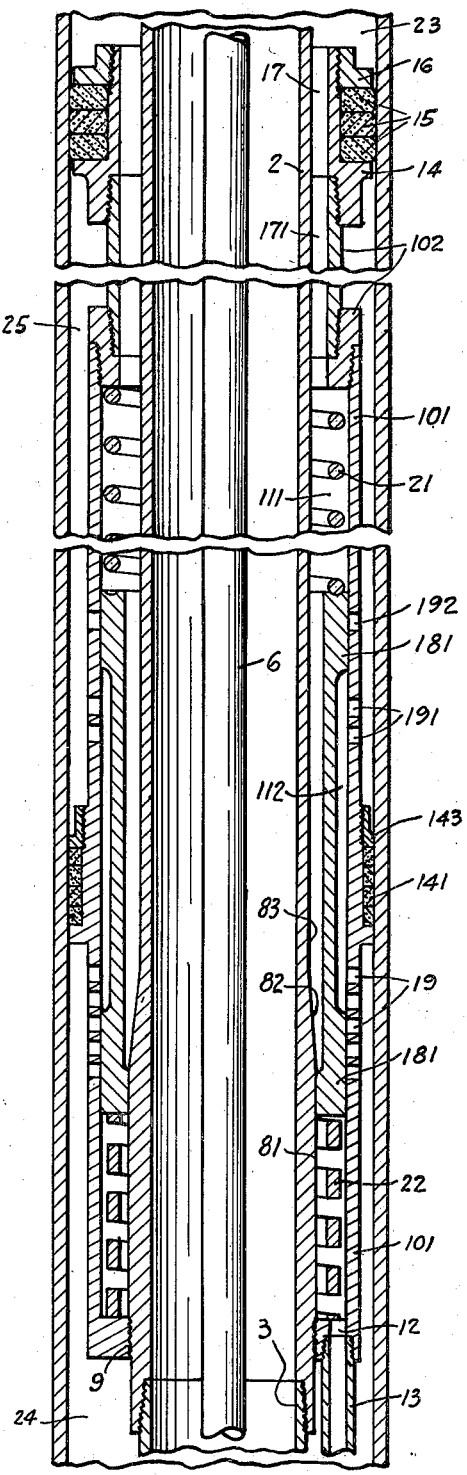

Fig. 2 corresponds with Fig. 1 but shows the well equipped with another form of my invention for the cyclic release of formation fluid pressure and the reapplication of higher than formation fluid pressure from and to the well cavity and the adjacent producing formation. In this other form of my invention, I use three casing compartments, a lower, an intermediate, and an upper, formed by a housing, a housing extension and two packers.

Fig. 3 is a similar view of the lower portion of the device.

The three figures together show the material features of my invention.

In the drawings I show an outer well casing 1, and an inner pump tubing 2. Said tubing has its lower end formed into a working barrel 3 in the lower end of which is a standing valve 4 of ordinary construction. A pump plunger or piston 5 is reciprocated in the barrel by means of the usual sucker rods 6 below the standing valve is an inlet pipe 7 which may be perforated if desired to act as a strainer. It is to be understood that the invention is to be employed with any conventional type of pump using a reciprocating plunger or other lifting means. I further show a tubular piece 8 which may be a special joint of tubing in the tubing string 2 or it may be a tubular piece surrounding and closed against a part of the tubing string 2. In either case 8 has provision made at 9 for the attachment of a tubular housing 10 or 101 closed inwardly at its lower end against the tubular piece 8 except for an opening or port 12 into which is connected an actuating pipe or duct 13. Said actuating pipe is of small cross section and extends downwardly along the tubing 2 to a level to provide a chamber or compartment above its lower end and between the casing and tubing for the accumulation of gas and liquid as will be later noted. The lower end of the actuating pipe or duct is open.

In Fig. 1, 10 is a tubular housing closed inwardly (except as to port 12) at its lower end against the tubular piece 8 at 9, and closed outwardly at its lower end against the casing 1 by packer 14, which packer and housing 10 separate the casing space into two compartments, an upper 23 and a lower 24. The packer includes a tubular body 14 spaced from the tubing 2 or 8 to provide a passage 17 into the upper compartment from chamber 11. It has packing rings 15 held in position by gland 16. Housing 10 is spaced outwardly from 8 to provide an irregularly shaped annular chamber 11 between them.

Within the chamber 11 is an annular or sleeve valve 18 normally closing a port or a plurality of openings 19 in the body of the housing 10. These openings are located between the two closed ends of housing 10 and when opened by valve 18 make communication between the lower casing compartment outside of housing 10 and the chamber 11 inside of housing 10 and on through passage 17 to the upper compartment. Said valve 18 (to accommodate spring 21) may be spaced slightly from tubular piece 8 except at its lower end where an inwardly projecting flange (or member) 20 on said valve slidably contacts upwardly along the cylindrical outer surface 81 of the tubular piece 8 until the lower edge of said valve approximately aligns with the lower edges of openings 19 when flange 20 slidably leaves cylindrical surface 81 and thereafter opposes a frusto-conical outer surface 82 of the tubular piece 8 until said valve 18 approaches or is substantially in its uppermost open position when the area of the annular opening between the inner surface of flange 20 and outer surface 83 of tubular piece 8 is at its maximum. Said annular passageway area between flange 20 and frusto-conical surface 82 should preferably be in any opposing position of valve 18 substantially less than the opened-up area of openings 19 in that valve position and also less than the annular area of passage 17. This is done in order that gas pressure entering chamber 11 from the lower compartment through openings 19 and acting upwardly on the annular bottom area of valve 18 shall approximate that pressure which is in the lower casing compartment below packer 14, so that most of the wiredrawing of the gas, in flowing from the lower to the upper compartment in the pressure-releasing period of the cycle, shall take place in the annular space between flange 20 of valve 18 and the frusto-conical surface 82 of tubular piece 8, rather than in openings 19 and passage 17.

Above the sleeve valve is a coiled compression spring 21 which tends to hold said valve, with openings 19 closed, against a lower supporting spring 22. The latter spring is stronger than the spring 21 and may only be compressed by strong fluid pressure from above acting downwardly on the annular area of valve 18, as when initially putting the well back to pumping after a shut down. The normal position of valve 18 is shown in Fig. 1, having closed openings 19 in the housing 10, terminating the "pressure-releasing" period and initiating the "pressure-reapplication" period of the cycle.

In Fig. 2 I show a slightly different embodiment of the invention in which 101 is a tubular housing closed inwardly (except as to port 12) at its lower end against tubular piece 8 at 9 and also closed outwardly against casing 1 just above openings 19 by a packer or seal 141 which together with a portion of housing 101 separates the lower casing compartment 24 from the intermediate casing compartment 25 and also separates the lower casing compartment 24 from chamber 111 and the upper compartment 23. On the upper end of housing 101 above packer 141 is a housing extension 102 consisting of a reducer attached to the top of 101 and as many coupled tubular members (or joints) as are needed for the required volume of the said intermediate compartment. The said tubular members of extension 102 are spaced from the tubing 2 or 3 to form passage 171, which passage together with passage 17 connects chamber 111 with the upper compartment. They likewise are spaced from casing 1 to form, between their perimeter and the inside diameter of the casing 1, the said intermediate casing compartment.

Attached to the upper end of housing extension 102 is packer 14 with its body 14, packing rings 15 and gland 16; also passage 17 leading to and opening into the upper casing compartment. This packer or seal 14 separates the intermediate compartment from the upper compartment.

Housing 101 has a port or plurality of openings 19 (corresponding with those in housing 10, Fig. 1) located just below packer 141. They make communication, through the tubular body of housing 101, between the lower compartment and chamber 111. Housing 101 also has a port or plurality of openings 191 located just above packer 141. They make communication, through the tubular body of housing 101, between the lower end of the intermediate compartment and the upper portion of chamber 111.

Within the chamber 111 is an annular or sleeve valve 181 shown in Fig. 2 in normal closed position corresponding with the termination of the "pressure-releasing" period and the initiation of the "pressure-reapplication" period of the cycle. The valve 181 consists preferably of three consolidated members; a lower annular one of such vertical length as to close openings 19 with proper overlap; an upper annular one having its lower edge (in the normal closed position of the valve as shown) above the uppermost openings 191 and of such length as to prevent harmful leakage of gas by it; and a concentric tubular body connecting the two above annular members and forming an annular port 112 connecting openings 191 with the uppermost of the openings 19 and partitioning said port 112 from chamber 111.

Above openings 191 and below the upper end of housing 101 are one or more ports or openings 192 making communication between the intermediate casing compartment and the upper end of chamber 111. They are closed from chamber 111 by valve 181 in all positions of same except when it is moved to a sub-normal position with spring 22 compressed by strong pressure admitted to the upper compartment acting on the annular area of valve 181 which moves it downward and uncovers openings 192 and admits said pressure from the upper compartment into the intermediate compartment from which latter it escapes, through those openings 191 which are still uncovered and valve port 112 and the uppermost openings 19, into the lower compartment above the liquid in same, as when putting the well back to pumping after a shutdown.

Tubular piece 8 as in Fig. 1 has a cylindrical surface 81, and frusto-conical surface 82 opposing the lower end of valve 181 in its several operating positions, and together with cylindrical surface 83 forms the inner wall of chamber 111.

Above and below the sleeve valve 181 are springs 21 and 22 which function as they do in that form shown in Fig. 1.

The normal position of valve 181 is shown in Fig. 2, having closed the communication through openings 19 between the upper casing compartment and the lower casing compartment and having opened communication, through openings 191 and valve port 112 and the uppermost openings 19, between the intermediate casing compartment and the lower casing compartment.

I have shown packer 141 fitted with pressure cups held in by gland 143. As in the case of packer 14, any preferred form of packer or seal may be used.

My invention includes the placing of gaseous fluid pressure upon the formation and then releasing such pressure. This application and release of pressure may be alternated repeatedly. When a sufficient flow of gas from the producing formation results, operation will thereafter be automatically as follows:

In the embodiment shown by Fig. 1, valve 18 has closed openings 19 after completing release of gaseous pressure from the lower compartment and well cavity and the adjacent formation, and after building up liquid level in said lower compartment and in actuating pipe 13, to the desired level, so that static pressure due to the built-up column of liquid approaches formation pressure;

thus completing the "pressure-releasing" period and initiating the "pressure-reapplication" or "reabsorbing" period of the cycle.

During this "pressure-releasing" period there has transpired:

A rapid release or removal of gas pressure from the well cavity and adjacent formation and lower compartment; into the upper compartment and out at the surface;

An accelerating disturbance and agitation and meandering in the flow of the fluid in the adjacent and outlying producing formations, as pressure is rapidly released from the lower compartment and well cavity and adjacent formation and the flow of fluid is resumed;

A globular or breathing movement of the fluid in the well cavity and adjacent formation due to the expansion of the gaseous content of the flowing fluid, when fluid pressure was removed from same;

A rush of fluid from the outlying formation into and through the adjacent formation and into the well cavity and lower compartment;

A continued escape of gas, from the fluid entering the lower compartment, into and out of the upper compartment;

A building up of the liquid level in the lower compartment, to the maximum desired level; and;

An interruption and disturbance and agitation and meandering in the flow of fluid in the adjacent formation.

Gas still entering the lower compartment from the well cavity and adjacent formation builds up pressure and accumulates (openings 19 being closed) above the built-up liquid level in said lower compartment and as the gas increases in pressure it depresses the liquid level in the lower compartment (but not in the actuating pipe) until the desired depressed low liquid level is reached, when fluid pressure in the formation is nearly balanced by the built-up gaseous pressure in the lower compartment above the liquid level.

This is the end of the "pressure-reapplication" or "reabsorbing" period of the cycle.

During this period there has transpired:

A building up of gas pressure in the lower compartment above the built-up column of liquid.

A depressing of the level of the liquid in the lower compartment until gas pressure above it has reached its maximum and the level of the liquid its desired minimum;

A globular or breathing movement of the fluid in the well cavity and adjacent formation due to the compression of the gaseous content of the flowing fluid, upon the reapplication of gaseous pressure in the fluid;

A return into the adjacent formation from the lower levels of the well cavity (corresponding in effect to the washing of the formation with wash pipe as is periodically done at present) of a part of the liquid, as its level is depressed in the lower compartment by building up gas pressure above it.

At this point in the cycle, the lower end of the actuating pipe 13 is uncovered by the depressed liquid column. Gaseous pressure then enters pipe 13 and displaces liquid therein and acting in chamber 11 under valve 18 moves it upwards against resistance of spring 21, until its lower edge uncovers lower edges of openings 19. Full gaseous pressure from the lower compartment then enters chamber 11 through openings 19 and acting under valve 18 opens it rapidly as far and keeps it open as long, against closing force of spring 21, as the quantity of gas to be released required.

This initiates the "pressure-releasing" or reducing period of the cycle.

Built-up pressure above the depressed liquid in the lower compartment and from the well cavity and adjacent formation, now rapidly escapes through openings 19 and chamber 11 and passage 17 into the upper casing compartment and out at the surface of the ground. This release of gaseous fluid pressure causes a rush of fluid into the well. The liquid level in the lower compartment continues to build-up, the gas from the entering fluid passing on into the upper compartment through openings 19, chamber 11, passage 17 and on out, until the building-up column of liquid reaches the desired high level when gas pressure above it has reached the desired minimum and then allows spring 21 acting on valve 18 to complete the closing of openings 19, stopping further escape of gas from the lower compartment.

This ends the "pressure-releasing" period of the cycle.

The operations or cycles are continuously repeated.

In that form shown by Fig. 2, valve 181 has just closed openings 19 from chamber 111 and thus interrupted communication between the lower and upper compartments. It has at the same time uncovered the uppermost openings 19 to valve port 112, making communication through openings 191 and port 112 and uppermost openings 19 between the intermediate compartment (which is filled with gas at maximum built-up pressure) and the lower compartment (which has minimum gaseous pressure and maximum built-up level of liquid in it.)

Fluid pressure in the formation and static pressure of the built-up column of liquid in the lower compartment are approximately equal. Maximum stored-up gas pressure from the intermediate compartment enters the lower compartment (through 191, 112 and uppermost 19) above maximum built-up liquid level in same and adds its equalized pressure of gas to the static pressure of the built-up column of liquid, making said combined pressure largely predominate over normal formation pressure. This causes a rapid depression in the level of the liquid in the lower compartment with reabsorption and reversed flow back into the lower levels of the adjacent formation from the lower levels of the well cavity.

Gas continues to flow into the lower compartment from the well cavity and adjacent formation and (lower openings 19 into chamber 111 being closed) it accumulates and builds up to maximum gas pressure in both the lower and intermediate compartments (but not in actuating pipe 13) and continues to depress liquid level in the lower compartment. Finally the depressed liquid level reaches the desired low level and uncovers the lower end of actuating pipe 13 and admits gas from the lower compartment to chamber 111 below valve 181 which causes said valve to move up and uncover the lower edge of openings 19, admitting full gas pressure from the lower compartment to the bottom annular area of valve 181 and opening it against the resistance of spring 21.

This terminates the "pressure-reapplication" or "reabsorbing" period of the cycle.

Valve 181 is opened and held open by gas pressure in the lower compartment and releases gas through openings 19 and chamber 111 and passages 171 and 17 into the upper compartment until liquid level in the lower compartment has built-up to the desired maximum and gas pressure above the liquid has been reduced to the desired minimum, when spring 21 moves valve 181 downwards and closes openings 19 preventing further escape of gas from the lower compartment.

This terminates the "pressure-releasing" period and again initiates the "pressure-reapplication" period of the cycle.

The operations or cycles are continuously repeated.

It will be noted that valve 18 or 181 is actuated into opening (to release gas pressure from the well) by the predetermined low level of the liquid in the lower casing compartment as fixed by the elevation or position in same of the lower end of the actuating pipe or duct 13; and not directly by gas pressure in said compartment.

It will also be noted that this valve 18 or 181 after opening, performs dual functions, namely:

First: That of a "gas releasing valve" opening and remaining open and releasing, if so desired, substantially all the gas which was shut in, in the lower compartment and well cavity and adjacent formation during the preceding pressure reapplication period, and;

Second: That of a "minimum-pressure regulating valve", closing and preventing further escape of gas from the lower compartment when gas pressure above the liquid in same has been reduced, by escape, to a predetermined minimum pressure, as fixed by the force of spring 21 acting to close the valve against the said minimum gas pressure acting on the under-side area of the valve to keep it from closing.

It will further be noted that a characteristic and requisite feature of this valve 18 or 181 is, that while gas pressure in the pressure-reducing period, only slightly above the predetermined minimum, must prevent the valve from entirely closing, gas pressure throughout the pressure reapplication period, must not cause the valve to open. In other words, the valve which must remain open or partly open throughout the pressure-reducing period, while gas pressure is changing from maximum to minimum, must not reopen in the pressure-reapplication period while the pressure is changing back from minimum to maximum.

While I prefer for obvious reasons to use a packer and separate the casing space into a plurality of compartments as outlined herein, I nevertheless wish it understood that my device and method are not dependent upon such construction, but may be used in a single casing compartment when the quantity of gas available and avenues of disposal of the gas without waste, make such use desirable. My method operates to increase the production of and prolong the life of, wells which may be pumped by any preferred type of apparatus simultaneously with carrying out of my invention.

What I claim as new is:

1. In a device of the character described including a well casing and a well tube; the combination of a housing spaced from said casing and from said tubing and closed against said tubing at its lower end, and closed against said casing at its upper end, a sleeve valve in said housing normally closing openings in said housing below said upper closure, a duct having a fluid-tight engagement with the lower end of said housing and projecting downwardly in said casing, said valve being moved upwardly to expose said openings when the liquid level in the well has been depressed below said duct and gaseous pressure has entered below said valve.

2. In a device of the character described including a well casing and a tubing, the combination of a housing disposed at its lower end in sealing engagement with said tubing and at the upper end in sealing engagement with said casing, a duct connected with said housing and extending downwardly, and means in said housing actuated by fluid pressure in said duct, to open a passage through said housing from said casing for pressure fluid.

3. A well casing, a tubing therein, a packer closing the space between said casing and said tubing above the liquid level in the well whereby gaseous pressure fluid may accumulate below said packer, and means actuated by fluid pressure below said packer when the liquid level has been depressed in said casing a predetermined amount to open a passage past said packer and outside said tubing for the escape of fluid pressure.

4. A well casing, a tubing therein, a packer closing the space between said casing and said tubing at a point spaced above the liquid level in the well whereby gaseous pressure fluid may accumulate below said packer, a fluid duct from said packer extending a predetermined distance below said packer, and means actuated by fluid pressure entering said duct to open a passage past said packer and release the fluid pressure below said packer.

5. A well casing, a tubing therein, means to close the space between said casing and said tubing at a point spaced above the liquid level in the well whereby gaseous pressure fluid may accumulate below the closure means, a fluid conducting tube from said closure means extending a predetermined distance below the same, and a valve adjacent said closure means and held resiliently in position to close the passage of fluid, said valve being actuated by fluid pressure entering said tube to open a passage past said closure means and release the fluid pressure below the same.

6. In a device of the character described including a well casing and a well tube, the combination of a housing spaced from said casing and from said tube and closed against said tube at its lower end and closed against said casing at its upper end and closed against said casing at a point between the lower and upper closures to form lower, intermediate, and upper casing compartments, there being openings in said housing body above said lower closure and openings in said housing body above said intermediate closure, a valve in said housing controlling said openings, a duct having a fluid tight engagement with the lower end of said housing and projecting downwardly in said casing, said valve being moved upwardly to expose the openings which are above the lower closure and so open communication between the lower and upper compartments and close communication between the lower and intermediate compartments when the liquid level in the well has been depressed below said duct and gaseous pressure has entered below said valve, said valve being returned to initial position to close communication between the lower and upper compartments and open communication between the intermediate and lower compartments when gaseous pressure in the lower compartment has been desiredly reduced and liquid level in same has been desiredly built-up.

7. A method of improving the production of liquid in wells equipped with well casing and tubing including raising liquid from the well through said tubing, and thus causing a flow of fluid toward said well, shutting off the passage of gaseous pressure fluid from said well outside said tubing above the built-up liquid level, building up gaseous fluid pressure above the liquid level and depressing the liquid level, to move fluid backwardly from said well, suddenly relieving said gaseous fluid pressure, and building up the liquid level and then repeating the operation.

8. A method of improving the production of liquid in wells equipped with well casing and tubing including raising liquid from the well through said tubing, and thus causing a flow of fluid toward said well, shutting off the passage of gaseous pressure fluid from said well outside said tubing above the built-up liquid level, building up gaseous fluid pressure above the liquid level and depressing the liquid level until it reaches a predetermined low level to move fluid backwardly from said well, and then opening a passage to suddenly release the pressure in the well and build up the liquid level and then again closing said passage.

9. A method of improving the production of liquid in wells equipped with well casing and tubing including raising the liquid from the well through said tubing, and thus causing a flow of fluid toward said well, cyclically interrupting the passage of gaseous pressure fluid from above the built-up liquid level in lower portion of said casing, admitting built-up gaseous pressure fluid from within said casing to said lower portion above the built-up liquid level in same and depressing the said built-up liquid level, building up gaseous fluid pressure and further depressing the liquid level until it reaches a predetermined low level in the maximum built-up gaseous fluid pressure above it, shutting in the maximum built-up gaseous fluid pressure, quickly releasing the built-up gaseous fluid pressure from above the depressed liquid level to an upper compartment in said casing and out of same at the surface of the ground, continuing the escape of gaseous pressure fluid and the building-up of the liquid level until the desired built-up liquid level in same is attained with correspondingly reduced gaseous fluid pressure above said level, and again interrupting the escape of said gaseous pressure fluid, and repeating the operation.

CLARENCE N. SCOTT.